(12) United States Patent
Kisu et al.

(10) Patent No.: US 11,007,954 B2
(45) Date of Patent: May 18, 2021

(54) SHEETED HARNESS

(71) Applicant: Yazaki Corporation, Tokyo (JP)

(72) Inventors: Naomi Kisu, Susono (JP); Atsuyoshi Yamaguchi, Susono (JP); Koichi Kondo, Susono (JP); Jun Takeda, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/577,741

(22) Filed: Sep. 20, 2019

(65) Prior Publication Data

US 2020/0130613 A1 Apr. 30, 2020

(30) Foreign Application Priority Data

Oct. 24, 2018 (JP) .............................. JP2018-200108

(51) Int. Cl.
*H02G 3/36* (2006.01)
*B60R 16/02* (2006.01)
*H01B 7/00* (2006.01)
*B60R 13/02* (2006.01)

(52) U.S. Cl.
CPC ....... *B60R 16/0207* (2013.01); *H01B 7/0045* (2013.01); *H02G 3/36* (2013.01); *B60R 13/0212* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,077,947 A | * | 2/1963 | Peebles | E04B 1/8409 442/229 |
| 3,168,617 A | * | 2/1965 | Richter | H01B 7/0838 174/117 FF |
| 3,194,279 A | * | 7/1965 | Brown | H01B 13/01227 29/872 |
| 4,119,794 A | * | 10/1978 | Matsuki | B32B 3/28 174/68.1 |
| 4,869,670 A | | 9/1989 | Ueda et al. | |
| 4,977,487 A | * | 12/1990 | Okano | B60Q 1/50 362/555 |
| 5,001,308 A | * | 3/1991 | Mori | H01H 13/702 200/292 |
| 5,127,062 A | * | 6/1992 | Cerda | H05K 13/06 324/66 |

(Continued)

FOREIGN PATENT DOCUMENTS

| | | | | |
|---|---|---|---|---|
| DE | 102007001039 A1 | * | 9/2007 | ............ B60J 5/0416 |
| FR | 297104 A1 | * | 7/1977 | ............... H05K 7/06 |

(Continued)

*Primary Examiner* — William H. Mayo, III
*Assistant Examiner* — Krystal Robinson
(74) *Attorney, Agent, or Firm* — Sughrue Mion, PLLC

(57) ABSTRACT

A sheeted harness comprising a single piece of sheet member, and a plurality of electric wires arranged on the sheet member. The sheet member is provided on only one side of the plurality of electric wires. The plurality of electric wires is arranged on the sheet member such that a portion of each of the plurality of electric wires is attached, separately from one another without being bundled, to the sheet member.

15 Claims, 4 Drawing Sheets

(56) References Cited

U.S. PATENT DOCUMENTS

| | | | | |
|---|---|---|---|---|
| 5,309,634 A * | 5/1994 | Van Order | ......... | B60R 16/0207 174/72 A |
| 5,649,626 A * | 7/1997 | Sawamura | ......... | B60R 16/0215 206/509 |
| 5,895,889 A * | 4/1999 | Uchida | ............... | H02B 1/202 174/72 A |
| 5,947,478 A * | 9/1999 | Kwan | .................. | A63F 9/24 273/460 |
| 6,179,359 B1 * | 1/2001 | Clauson | ............ | B60R 13/0206 296/203.02 |
| 6,582,013 B1 | 6/2003 | Inoue et al. | | |
| 6,744,147 B2 * | 6/2004 | Taniguchi | .......... | B60R 16/0207 307/10.1 |
| 7,086,687 B2 * | 8/2006 | Aoki | ................. | B60R 16/0215 296/155 |
| 10,096,399 B2 * | 10/2018 | Kawaguchi | ...... | H01B 13/01281 |
| 10,276,278 B2 * | 4/2019 | Kawaguchi | ......... | H01B 7/0045 |
| 10,410,764 B2 * | 9/2019 | Itou | ..................... | H01B 7/2825 |
| 10,468,161 B2 * | 11/2019 | Kominato | ............... | B21D 7/14 |
| 2002/0019165 A1 * | 2/2002 | Aoki | ................. | B60R 16/0207 439/502 |
| 2007/0044989 A1 * | 3/2007 | Nishijima | ............ | H02G 3/0468 174/72 A |
| 2008/0094213 A1 * | 4/2008 | Morgan | ........... | B60R 21/01534 340/552 |
| 2010/0294563 A1 * | 11/2010 | Yamashita | .......... | B60R 16/0215 174/72 A |
| 2011/0204190 A1 * | 8/2011 | Ikeda | .................. | H02G 11/006 248/49 |
| 2011/0240089 A1 * | 10/2011 | Wootton | ........... | H01L 31/02013 136/244 |
| 2012/0001457 A1 * | 1/2012 | VanHouten | .............. | H05K 3/12 296/214 |
| 2014/0097636 A1 * | 4/2014 | Snider | ........................ | B60J 3/02 296/97.8 |
| 2014/0102751 A1 * | 4/2014 | Iwasaki | ............... | B60R 16/0215 174/107 |
| 2014/0305697 A1 * | 10/2014 | Hudson | .................... | H02G 1/06 174/72 A |
| 2014/0326708 A1 * | 11/2014 | Barfuss | ................ | B60N 2/5685 219/204 |
| 2015/0224856 A1 * | 8/2015 | Snider | ................... | B60J 7/0015 296/152 |
| 2015/0283962 A1 * | 10/2015 | Kobayashi | .......... | B60R 16/0207 174/72 A |
| 2016/0358690 A1 * | 12/2016 | Liu | ........................ | B32B 5/028 |
| 2017/0243673 A1 * | 8/2017 | Nakashima | .......... | C09D 151/08 |
| 2018/0363174 A1 * | 12/2018 | Kondo | ................. | D03D 15/593 |
| 2019/0287700 A1 * | 9/2019 | Hamada | .................. | B60R 13/08 |

FOREIGN PATENT DOCUMENTS

| | | |
|---|---|---|
| JP | S61-035318 U | 3/1986 |
| JP | S63-046945 A | 2/1988 |
| JP | H01-307180 A | 12/1989 |
| JP | 2001-130339 A | 5/2001 |
| JP | 2002249004 A * | 9/2002 |
| JP | 2004-74954 A | 3/2004 |
| JP | 2005047354 A * | 2/2005 |
| JP | 2014-231272 A | 12/2014 |
| JP | 2017-188253 A | 10/2017 |

* cited by examiner

SHEETED HARNESS

CROSS-REFERENCE TO RELATED APPLICATION

The present application claims priority to Japanese Patent Application No. 2018-200108 filed on Oct. 24, 2018, the entire content of which is incorporated herein by reference.

TECHNICAL FIELD

The present invention relates to a sheeted harness.

BACKGROUND

A related art harness has a harness arranged and held between a pair of sheets (see, e.g., JP2004-074954A).

The related art sheeted harness requires cost for two sheets. In addition, the related art sheeted harness is sometimes too rigid to handle. That is, the harness between the pair of sheets has increased rigidity, as it is provided in a form of a bundle by taping or the like. The bonding of the pair of sheets further increases the rigidity. For example, when installing the sheeted harness along a vehicle roof, it may be difficult to conform to a curved surface of the vehicle roof. Further, the sheeted harness is difficult to fold when packing the sheeted harness.

SUMMARY

Illustrative aspects of the present invention provide a sheeted harness with reduced cost and reduced rigidity.

According to an illustrative aspect of the present invention, sheeted harness comprising a single piece of sheet member, and a plurality of electric wires arranged on the sheet member. The sheet member is provided on only one side of the plurality of electric wires. The plurality of electric wires is arranged on the sheet member such that a portion of each of the plurality of electric wires is attached, separately from one another without being bundled, to the sheet member.

DETAILED DESCRIPTION

Hereinafter, exemplary embodiments of the present invention will be described in detail with reference to the drawings. However, the following exemplary embodiments do not limit the scope of the claimed invention.

Figure 1:
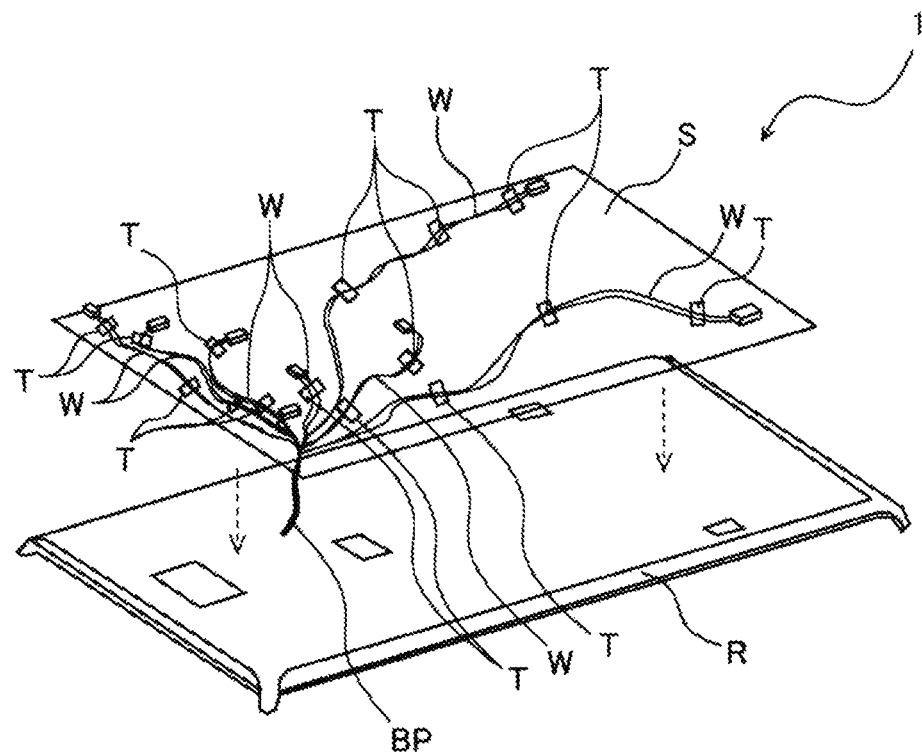
FIG. 1 is a perspective view illustrating an example of a sheeted harness according to an embodiment of the invention.
Figure 2:
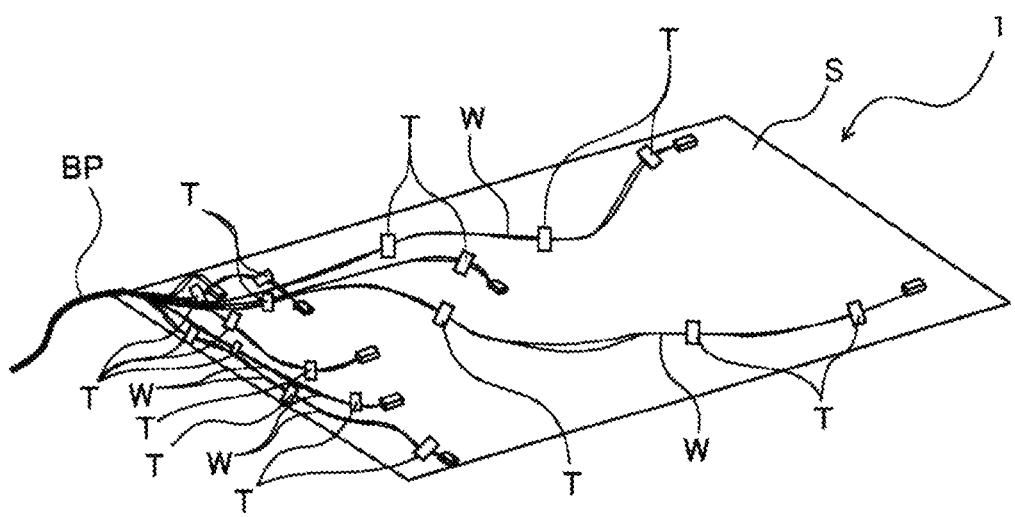
FIG. 2 is a perspective view illustrating a rear side of the sheeted harness illustrated in FIG. 1.

FIG. 1 is a perspective view illustrating an example of a sheeted harness according to an embodiment of the invention and FIG. 2 is a perspective view illustrating a rear side of the sheeted harness illustrated in FIG. 1. As illustrated in FIG. 1, the sheeted harness 1 is provided at, for example, a narrow portion between a roof liner R, which is the ceiling portion of a vehicle interior, and a vehicle body panel P (see FIG. 3 or the like) above the roof liner R.

The sheeted harness 1 includes a single piece of sheet member S and a plurality of electric wires W. The sheet member S is made of a flexible and foldable insulating sheet. The sheet member S is made of a material that allows an object on one side of the sheet member S to be seen through the sheet member S from another side. For example, the sheet member S is made of a colored or colorless transparent plastic sheet, or a non-woven fabric that allows an object beyond to be visually recognized through the interstices of fibers. The sheet member S may have a single-layer structure or may include two or more layers.

Furthermore, it is preferable that one sheet member S have at least one function of sound absorption, vibration absorption, heat shielding, and deodorizing. That is, the sheet member S may have an air layer inside as in a non-woven fabric or may perform sound absorption and vibration absorption by the air layer. Further, the sheet member S may have a heat insulating layer (air layer or heat insulating member) inside and the heat insulating layer may shield heat. In addition, the sheet member S may perform deodorization by containing a deodorant.

The plurality of electric wires W are electric wires for supplying power to auxiliary devices and transmitting signals in a roof portion. The electric wires W are arranged on and attached to the sheet member S. In the embodiment, the electric wire W is attached to the sheet member S by attaching a tape T. The attachment of the electric wire W is not limited to the attachment by the tape T as long as it can be fixed to the sheet member S and may be attached to the sheet member S by adhesion, welding, or the like.

Figure 3:
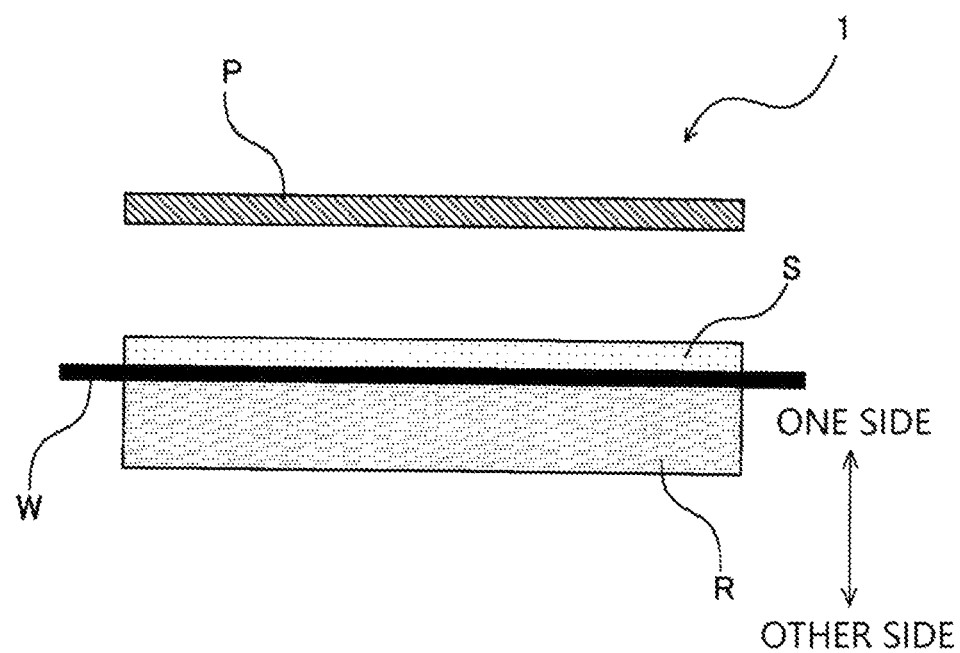
FIG. 3 is a schematic cross-sectional view of the sheeted harness illustrated in FIGS. 1 and 2.

FIG. 3 is a schematic cross-sectional view of the sheeted harness 1 illustrated in FIGS. 1 and 2. As illustrated in FIG. 3, in the embodiment, the sheet member S is provided on only one side of the plurality of electric wires W and is not provided on the other side. Further, in the embodiment, the sheeted harness 1 is disposed such that the plurality of electric wires W are on the roof liner R side and the sheet member S is on the vehicle body panel P side.

Figure 4:
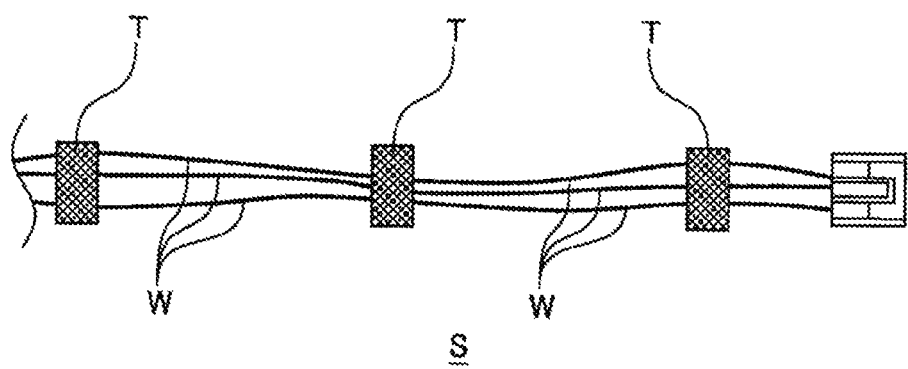
FIG. 4 is a partially enlarged view around a plurality of electric wires illustrated in FIG. 2.

FIG. 4 is a partially enlarged view around the plurality of electric wires W illustrated in FIG. 2. In the embodiment, the plurality of electric wires W are attached to the sheet member S in a state where the respective electric wires W form a single electric wire W and are not bundled. That is, as illustrated in FIG. 4, the plurality of electric wires W are attached to the sheet member S in a state of being not converged by tape winding or the like.

As illustrated in FIGS. 1 and 2, in the sheeted harness 1 according to the embodiment, the plurality of electric wire W is tape-wound and bundled at the edge portion (a portion other than the central portion described below) of the sheet member S and in an area outside the sheet member S and therefore a bundled portion BP is formed. Therefore, the sheeted harness 1 is made difficult to be entangled with the plurality of electric wires W at the time of packing and transportation and is easy to be wired in a pillar.

In particular, the sheeted harness 1 according to the embodiment has a structure without a branch portion in the central portion (for example, 90% of the central area of the entire area of the sheet member S) of the sheet member S.

That is, in the embodiment, the plurality of electric wires W branch only from the bundled portion BP and there is no branched portion at other portions, so there is no branched portion at least at the central portion of the sheet member S. Here, when there is a branched portion, many electric wires W will be provided in a collected state before branching. Even when the collected electric wires W are not bundled by tape winding or the like, the collected electric wires W can be a factor to increase the rigidity. Therefore, as in the embodiment, by having a configuration in which the central portion of the sheet member S does not have a branch portion, it is possible to suppress a situation in which rigidity is increased due to the collected electric wires W.

Figure 5:
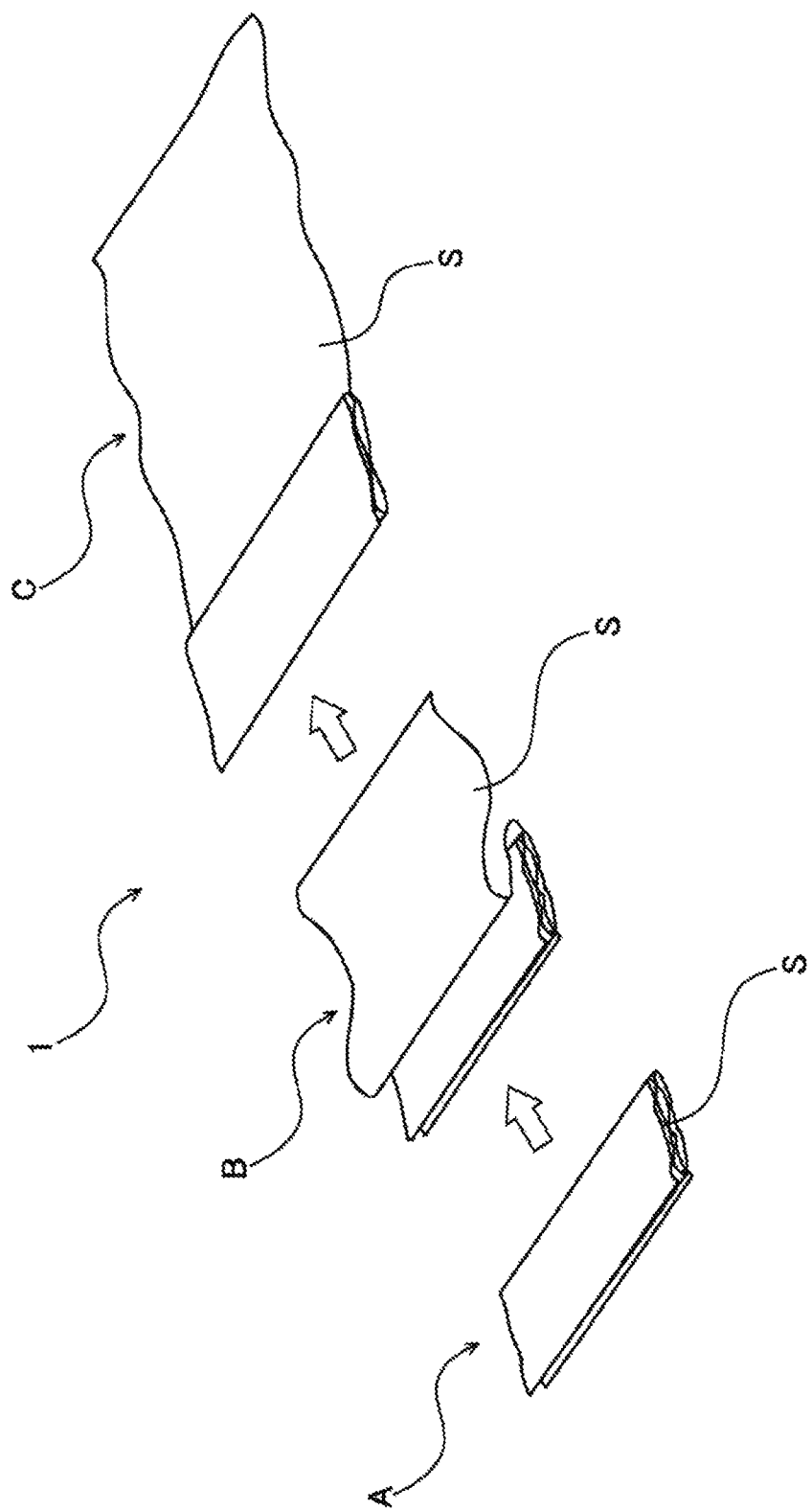
FIG. 5 is a perspective view illustrating a state of folding and unfolding of the sheeted harness illustrated in FIGS. 1 and 2.

Next, an attachment method of the sheeted harness 1 according to the embodiment will be described. FIG. 5 is a perspective view illustrating a state of folding and unfolding of the sheeted harness 1 illustrated in FIGS. 1 and 2. In FIG. 5, the illustration of the plurality of electric wire W and the like is omitted.

As illustrated in FIG. 5, the sheet member S of the sheeted harness 1 is flexible and foldable (see A in FIG. 5). Therefore, at the time of packing and transportation, it will be in the folded state shown by the reference letter A in FIG. 5.

When installing the sheeted harness 1 in the roof portion, first, the sheeted harness 1 is expanded (spread) sequentially (see B and C in FIG. 5). When the sheeted harness 1 is completely expanded (see FIG. 2), an operator installs the sheeted harness 1 on the roof liner R so that the plurality of electric wires W are on the roof liner R side and the sheet member S is on the vehicle body panel P side. Then, the sheeted harness 1 is attached to the vehicle body panel P with the roof liner R.

The plurality of electric wires W are tape-wound and bundled at the edge portion of the sheet member S and in an area other than the sheet member S. The bundled portion BP is arranged inside the vehicle pillar and connected to vehicle equipment on an instrument panel side.

Next, an example of a method of manufacturing the sheeted harness 1 will be described. First, the sheet member S is placed on a wiring board on which wiring paths are drawn. Next, the bundled portion BP is placed at, for example, the corner of the sheet member S.

Here, since the sheet member S is configured to allow an object on the other side of the sheet member S to be seen through the sheet member S, the wiring path on the wiring board is visually recognizable. The electric wires W are arranged along the wiring paths drawn on the wiring board and are attached to the sheet member S by the tapes T or the like. The sheeted harness 1 is thus manufactured.

According to the sheeted harness 1 of the embodiment described above, the sheet member S is provided on only one side of the plurality of electric wires W. There is no sheet member provided on the other side of the plurality of electric wires W. Therefore, cost reduction can be achieved and rigidity does not increase as in a case of using a pair of sheets. Further, because each of the electric wires W is separately attached to the sheet member S in a state of a single electric wire W. In other words, the portions of the electric wires W attached to the sheet member S are not bundled. Therefore, it is possible to provide the sheeted harness 1 with reduced rigidity and lower cost.

The electric wires W 1 do not have a branched portion at the central portion of the sheet member S. Therefore, the electric wires W are not gathered together at the central portion of the sheet member S, which otherwise would increase rigidity due to the electric wires W gathered together.

The sheet member S allows an object beyond to be seen through the sheet member S. This makes it possible to arrange the sheet member S on the wiring board or the like on which the wiring paths are drawn, allowing an easy fabrication of the sheeted harness 1 with accurate arrangement of the electric wires W on the sheet member S.

The plurality of electric wires W are bundled at the edge portion of the sheet member S and in an area other than the sheet member S. Therefore, it is possible to prevent a situation in which the plurality of electric wire W are spread apart on the sheet member S and become entangled at the time of packing.

The sheeted harness 1 is disposed between the roof liner R and the vehicle body panel P and is arranged so that the plurality of electric wires W are on the roof liner R side and the sheet member S is on the vehicle body panel P side. Thus, the sheet member S functions as a protective member for the electric wires W, which can contribute to eliminating the need for a protective exterior part.

While the present invention has been described with reference to certain exemplary embodiments thereof, the scope of the present invention is not limited to the exemplary embodiments described above, and it will be understood by those skilled in the art that various changes and modifications may be made therein without departing from the scope of the present invention as defined by the appended claims.

For example, the sheeted harness 1 according to the embodiment is preferably attached to, for example, the roof liner R. In this case, the sheeted harness 1 may be attached to the roof liner R by, for example, a double-sided tape or may be attached to the roof liner R by hot melt and adhesive bonding. Further, the sheeted harness 1 may be made of a material which allows the sheet member S to be heat weldable and may be attached to the roof liner R by heat welding.

Figure 6:
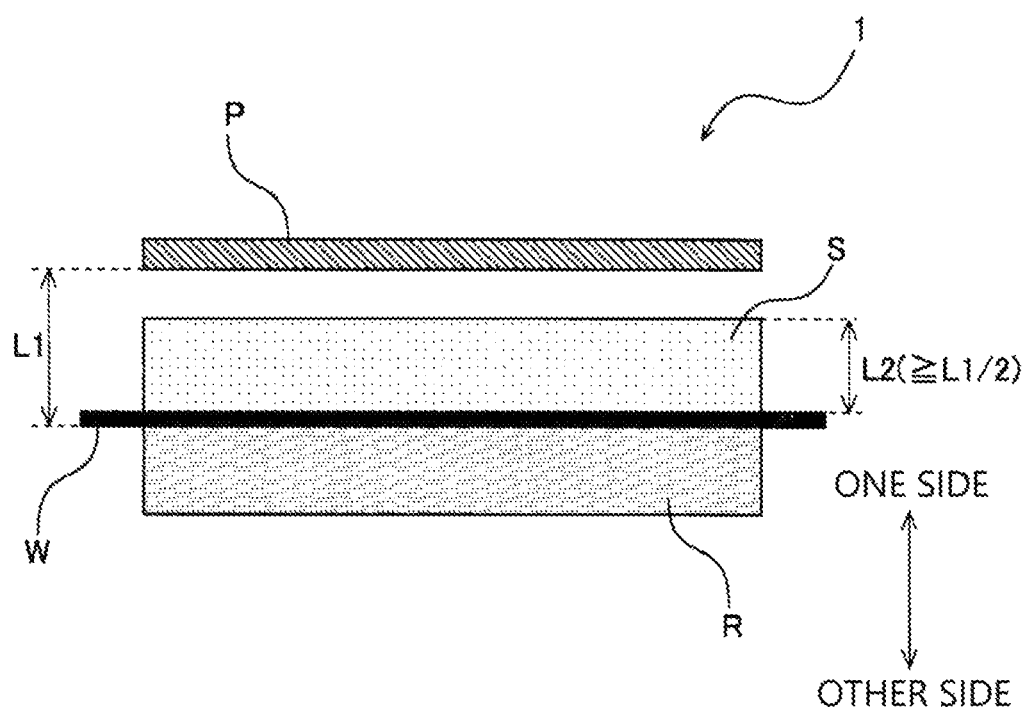
FIG. 6 is a schematic cross-sectional view of a sheeted harness according to a modification example of the embodiment.

In addition, while the thickness of the sheet member S has not been mentioned in the embodiment described above, it is preferable that the sheet member S has a certain thickness. FIG. 6 is a schematic cross-sectional view of the sheeted harness 1 according to a modification example of the embodiment. As illustrated in FIG. 6, in the sheeted harness 1 according to the modification example, the sheet member S is formed thick and has a thickness L2 which is half or more of a distance L1 between the roof liner R and the vehicle body panel P, for example. As a result, the sheet member S is disposed so as to fill a gap between the roof liner R and the vehicle body panel P, so that the noise suppressing effect and the heat insulating effect can be easily obtained.

Furthermore, in the embodiment, the plurality of electric wires W are bundled at the edge portion of the sheet member S and in an area outside the sheet member S. However, it is not limited to this and it may be bundled only at the edge portion of the sheet member S or may be bundled only in an area outside the sheet member S.

In addition, in the embodiment, the sheeted harness 1 is disposed such that the plurality of electric wires W are on the roof liner R side and the sheet member S is on the vehicle body panel P side. However, it is not limited to this and the plurality of electric wires W may be disposed on the vehicle body panel P side and the sheet member S may be on the roof liner R side. In this case, an opening may be formed in the sheet member S so as to make a connector connection with devices in the roof portion.

What is claimed is:

1. A sheeted harness to be installed on a roof liner of a vehicle, the sheet harness comprising:

a single piece of sheet member, and a plurality of electric wires arranged on the sheet member, wherein the sheet member is provided on only one side of the plurality of electric wires, and wherein the plurality of electric wires are arranged on the sheet member such that portions of each of the plurality of electric wires are provided and attached separately from one another to the sheet member allowing the sheet member to be installed on the roof liner with the plurality of electric wires pre-secured on the sheet member, and wherein the sheet member has flexibility.

2. The sheeted harness according to claim 1, wherein the plurality of electric wires do not have a branched portion at a central portion of the sheet member.

3. The sheeted harness according to claim 1, wherein the sheet member is configured such that an object on one side of the sheet member is visible through the sheet member from an opposite side of the sheet member.

4. The sheeted harness according to claim 1, wherein the plurality of electric wires are bundled at an edge portion of the sheet member or in an area outside the sheet member.

5. The sheeted harness according claim 1, wherein the sheeted harness is configured to be provided between the roof liner forming a ceiling portion of a vehicle interior and a vehicle body panel above the roof liner, such that the plurality of electric wires is arranged between the sheet member and the roof liner.

6. The sheeted harness according to claim 1, wherein the sheet member contains a deodorant.

7. The sheeted harness according claim 1, wherein the sheeted harness is made of a transparent material.

8. The sheeted harness according to claim 1, wherein the sheet member is directly attached to the roof liner.

9. The sheeted harness according to claim 1, wherein the sheet member is configured to be foldable.

10. The sheeted harness according to claim 1, wherein each of the plurality of electric wires is not bundled to other ones of the plurality of electric wires for an entire length of each of the plurality of electric wires at least in the central portion of the sheet member.

11. The sheeted harness according to claim 1, wherein the plurality of electric wires are attached to the sheet member with tape.

12. The sheeted harness according to claim 1, wherein the plurality of electric wires are fixed to the sheet member at a part of the plurality of electric wires in a longitudinal direction of the plurality of electric wires; and wherein the plurality of electric wires are not fixed to the sheet member at another part of the plurality of electric wires in the longitudinal direction of the plurality of electric wires, the another part being different from the part.

13. The sheeted harness according to claim 12, wherein the plurality of electric wires can move at the another part.

14. The sheeted harness according to claim 1, wherein the sheet member has a rectangular shape when being viewed from a thickness direction of the sheet member.

15. The sheeted harness according to claim 14, wherein the plurality of electric wires arranged on the sheet member such that the plurality of electric wires are dispersed across an entirety of the sheet member.

* * * * *